(12) United States Patent
Mitreuter et al.

(10) Patent No.: US 8,621,033 B2
(45) Date of Patent: Dec. 31, 2013

(54) METHOD FOR IDENTIFYING INTERNET USERS

(75) Inventors: Ulrich Mitreuter, Königsdorf (DE);
Stefan Unger, Unterhaching (DE);
Renate Zygan-Maus, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1730 days.

(21) Appl. No.: 11/516,619

(22) Filed: Sep. 7, 2006

(65) Prior Publication Data

US 2007/0071001 A1 Mar. 29, 2007

Related U.S. Application Data

(63) Continuation of application No. 10/221,570, filed as application No. PCT/EP01/09910 on Aug. 28, 2001, now abandoned.

(30) Foreign Application Priority Data

Sep. 5, 2000 (EP) ..................................... 00119184

(51) Int. Cl.
*G06F 15/16* (2006.01)

(52) U.S. Cl.
USPC .......................................... 709/217; 709/227

(58) Field of Classification Search
USPC .................................................. 709/217, 227
See application file for complete search history.

(56) References Cited

U.S. PATENT DOCUMENTS

| 5,586,260 | A | 12/1996 | Hu |
| 5,768,391 | A | 6/1998 | Ichikawa |
| 6,067,623 | A | 5/2000 | Blakley, III et al. |
| 6,795,917 | B1 * | 9/2004 | Ylonen ......................... 713/160 |
| 6,834,341 | B1 * | 12/2004 | Bahl et al. ..................... 713/156 |

FOREIGN PATENT DOCUMENTS

| JP | 5-298174 A | 11/1993 |
| JP | 10-177552 A | 6/1998 |
| JP | 2000-148685 A | 5/2000 |
| JP | 2000-207362 A | 7/2000 |
| WO | WO 97/15885 | 5/1997 |
| WO | WO 99/56434 | 11/1999 |
| WO | 01/93562 A1 | 12/2001 |

OTHER PUBLICATIONS

Date Dec. 12, 2001, International Search Report PCT/EP01/09910.
Date Nov. 21, 1997, Thayer, "Bulletproof IP with Authentication and Incription," Data Communications, pp. 55-60, Nov. 21, 1997.

* cited by examiner

*Primary Examiner* — John Follansbee
*Assistant Examiner* — Glenford Madamba
(74) *Attorney, Agent, or Firm* — Staas & Halsey LLP

(57) ABSTRACT

Method for identifying Internet users, comprising: identifying or authenticating an Internet user at the Internet access point in the course of an access check when using the Internet access service of an Internet Service Provider with whom the Internet user maintains a business relation; and after the Internet user successfully passed the access check adding Internet user identification information to an Internet user's IP message by the Internet access point prior to forwarding said IP message, guaranteeing the integrity of this information with cryptographic means.

11 Claims, 2 Drawing Sheets

METHOD FOR IDENTIFYING INTERNET USERS

CROSS REFERENCE TO RELATED APPLICATIONS

This application is a continuation of application Ser. No. 10/221,570, filed Sep. 13, 2002, which is a national stage entry of international application PCT/EP01/09910, filed Aug. 28, 2001 now abandoned; the contents of application Ser. No. 10/221,570, filed Sep. 13, 2002 are incorporated herein by reference.

METHOD FOR IDENTIFYING INTERNET USERS

1. Which Technical Problem is to be Solved by Your Invention?
2. How has this Problem been Solved Until Now?
3. How Does Your Invention Solve the Named Technical Problem (State Advantages)?
4. Embodiment[s] of the Invention.

Regarding Item 1

Figure 1:
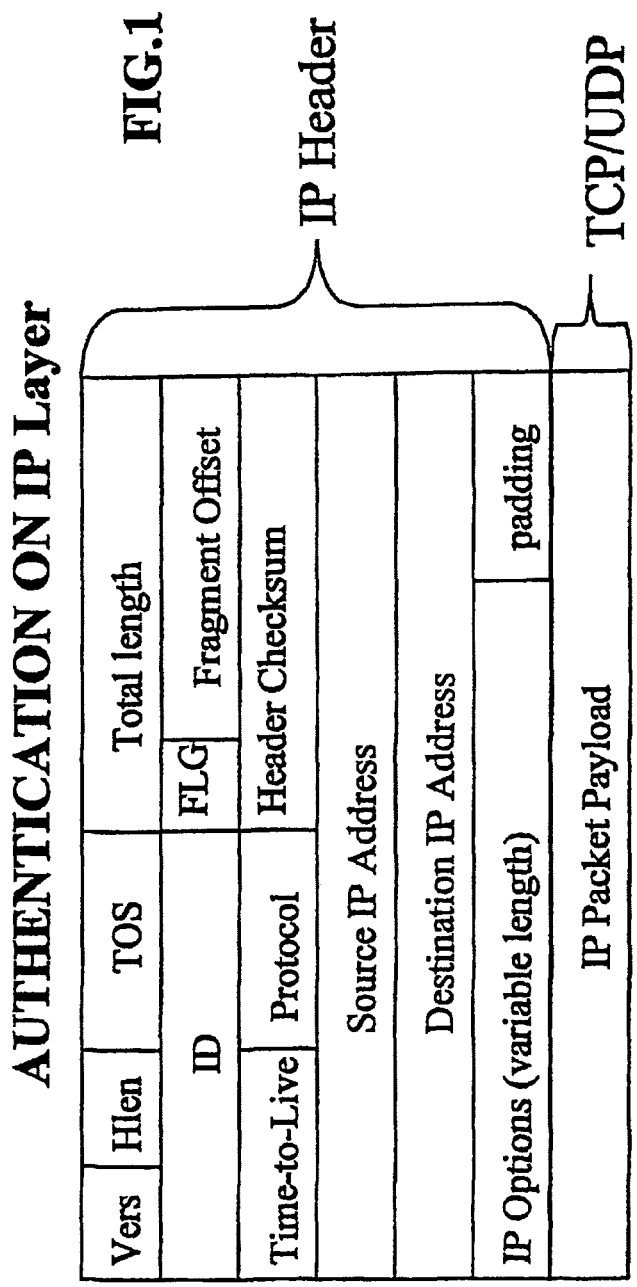
FIG. 1 shows authentication on an IP layer.

Which Technical Problem is to be Solved by Your Invention?

Internet Service Providers nowadays offer Internet access to the mass market without the service feature "net-wide identification of the Internet user". However, new Internet-based services require the identification of the Internet user to the service provider. This identification should also protect against manipulation and misuse by another Internet user. For example Internet phone services and Internet telephone net convergence services require the user of these services (i.e. the sender of the IP packets containing the service signal data) to be identified. The provider of such new Internet services is not necessarily identical with the Internet user's ISP (Internet Service Provider).

A net-wide introduction of the Internet user identification service according to the invention would significantly enhance trust in IP messages, and it would greatly facilitate the spread of commercial applications with their potentially higher security requirements, as well as help reduce Internet misuse.

Regarding Item 2

How has this Problem been Solved Until Now?

The currently known methods for the secured identification (authentication) of an Internet user all use the principle of end-to-end authentication, i.e., the communication partners authenticate themselves on a basis of identification and authentication data, which is assigned to each communication partner individually, and is made known to the other communication partner. This data can either a) be known to the other communication partner prior to the beginning of the communication (sufficient identification and authentication data has been saved by the communication partner) or b) be relayed to the other communication partner at the beginning of the communication by means of a trustworthy third party (identification and authentication data has been saved by a central, public certification entity).

Currently known methods for the secure identification of Internet users are:

I. Identification and authentication through the IP hosts used by the communication partners: IPSEC. This method requires both communication partners to use static IP addresses, and it requires these IP addresses to be unequivocally assigned to both communication partners. IPSEC is not suitable for the technical problem to be solved, since 1. the majority of Internet users uses dial-up access, and is assigned only a temporary IP address by their Internet service providers;
2. IPSEC as point-to-point method of type a) requires the identification and authentication data of all potential communication partners to be saved, and therefore is not suitable for the mass market of new Internet services.

II. Identification and authentication by means of TCP functions (TLS, Transport Layer Security). This method can principally be used by all application programs which use TCP/IP. It requires adjustments in the application programs as well as the provision of end-to-end identification and authentication data according to either principle a) or principle b).

III. Identification and authentication through the application programs in use.

The data for the identification of the user, such as his "name", is rendered into clear text in the application protocol (such as HTTP, FTP, Telnet, SIP). As proof that the sender is actually the name bearer, i.e. as authentication of the name, there are several possibilities, such as:

1. A mutual secret, such as a password which is only known to the user and his communication partner, is relayed in the application protocol or in the application reference data. This method can only be used in combination with a transfer which has been secured against "intercepting" (such as a coded transfer).
2. A mutual secret is being used to encode part of the message. If the recipient can decode the message, the sender is authenticated as possessing the code key.
3. By means of a challenge-response procedure in the application protocol, it is proven that the user is in possession of a mutual secret.
4. A mutual secret is used to generate a digital fingerprint of the message, which is attached to the message. If the recipient can reproduce this fingerprint, the sender is authenticated as possessing the mutual secret.
5. With the help of his "private key" of an asymmetrical authentication procedure, the sender generates a digital fingerprint of the message to be sent, which then is attached to the message, and he also attaches his electronic certificate to the message. This certificate contains the "public key" and the name of the user. The recipient can verify the digital fingerprint with the help of this public key. The recipient now also needs to verify the certificate. This is done according to standard procedure for certificates. For this purpose, the certificate contains a digital fingerprint of the certificate data, generated with the private key of a certification entity. If the recipient possesses the public key of the certification entity, he can verify the integrity of the user's certificate. Possession of the private key, which has been used for the generation of the digital fingerprint of the message, authenticates the user.

The disadvantage of all known methods is the large effort necessary for installation, administration and maintenance of various data bases containing the identification and authentication data of Internet users (either centralized, expensive certificate depositories, or many decentralized subscriber data bases at various service providers), as well as for managing the infrastructure, intended to secure the integrity of identification data (such as certificate revocation lists, security policy database). This effort is made necessary by the fact that each Internet user carries out the identification and authentication procedures for himself (principle of end-to-end authentication).

Regarding Item 3

How does Your Invention Solve the Named Technical Problem (State Advantages)?

Upon request, the Internet Service Provider supplies IP messages of clients with data which makes it possible to identify the Internet user's IP packets. The Internet Service Provider guarantees the integrity of this data with cryptographic means.

The difference to the above-mentioned methods therefore lies in the fact that the Internet user does no longer himself initiate his identification, but instead the Internet Service Provider takes over this task. With the help of the invention, the effort in identifying IP packets of Internet users is reduced.

A business relation between the Internet Service Provider and the Internet user is a prerequisite for the identification and authentication method according to the invention. Thereby, the Internet Service Provider possesses data which can be used to identify the Internet user. If the Internet user utilizes the access service of the Internet Service Provider (such as when establishing an Internet connection via the telephone line), he initially has to identify himself to the Internet Service Provider (typically with an account name and a password, which the Internet Service Provider has saved). After the authentication, the Internet Service Provider thus securely knows the identity of the Internet user. He can now add information identifying the Internet user to all IP packets of the Internet user. With this information, the Internet user's IP packets can be identified by other Internet Service Providers, without the Internet user having to provide his identification data; namely either according to principle a), i.e. the Service Provider has to save and administer the data specific to the Internet user, or according to principle b), i.e. with the help of a centralized certification entity.

An analogy from the Public Switching Telephone Network PSTN may clarify this idea. When establishing a connection in the telephone net, the phone number of the calling party comes up. The operator of the telephone net guarantees that this number actually identifies the line of the calling number; the phone number of the calling party is "network provided" or "user-provided, verified and passed". The calling party is not able to change the number, since it is assigned by the network and not by the user. At the same time, other participants in the telephone net cannot change this number. Therefore it is always possible to identify the parties participating in a telephone conversation with certainty.

This is not possible in the IP net, because first of all, the IP sender addresses in IP messages can be falsified, and second of all, the IP addresses are provided to the Internet user only on a temporary basis. According to the invention however, in an IP net, the Internet Service Provider as a trustworthy entity can supply the IP message with network-provided Internet user identification information in a manner that protects against falsification.

The invention takes advantage of the point-to-point Internet user identification, which is common between the Internet user and his Internet Service Provider for obtaining Internet access, in order to provide a net-wide secure identification of an Internet user through a trustworthy Internet Service Provider (equipped with a public certificate).

Regarding Item 4

EMBODIMENT[S] OF THE INVENTION

Figure 2:
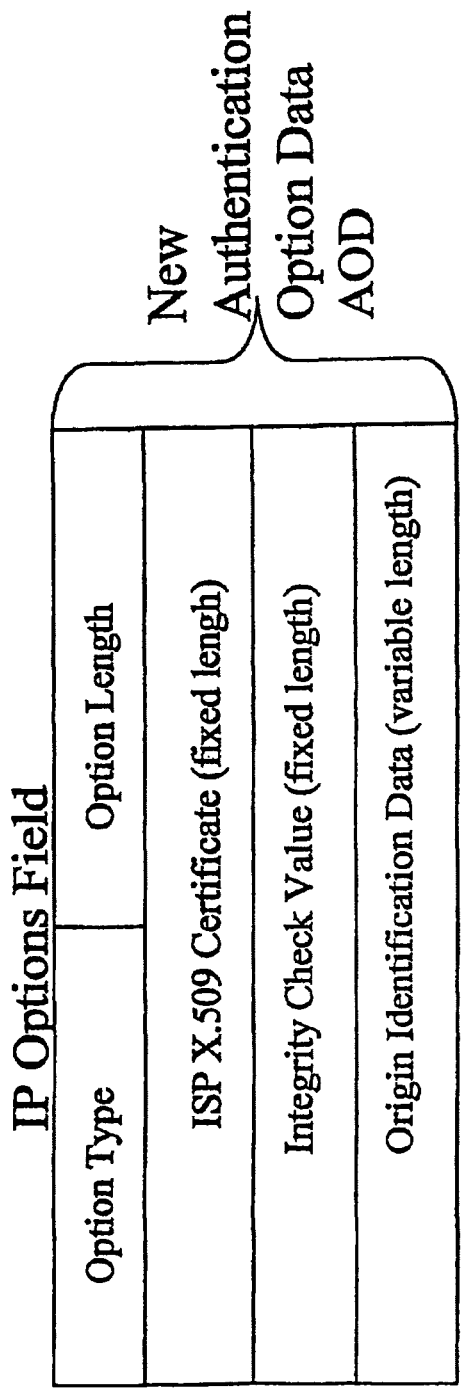
FIG. 2 shows new authentication option data.

For a generic solution (a solution which is independent of the transport- or application-protocol used) with the best possible performance, a realization on the IP level is suggested (see FIGS. 1 and 2).

At the POP (point of presence, access point) of the Internet Service Provider
- IP packets are screened for a certain (still to be determined) flag, a so-called authentication request flag, by which means the Internet user might be asked to provide identification data per IP packet, and/or
- a database (with an analogue function such as the Security Policy Database in IPSEC) is checked for whether the service "provide IP packets with identification data" is requested for the Internet user. Thereby, the destination IP address, the transport protocol or the TCP/UDP ports can serve as selectors.

If so, the Internet Service Provider adds data identifying the Internet User to the IP packet header. This could for example be a telephone number of the Internet User, or his user name for the Internet access subscription, which is known to his Internet Service Provider.

The Internet Service Provider subsequently derives a digital signature from the modified IP packets including the reference data sent by the user, in order to secure the identification data and the reference data sent by the user from falsification (data integrity). The modified IP packet is used to calculate a checksum, which is coded with the secret key of the Internet Service Provider (Integrity Check Value). Finally, the Internet Service Provider adds to the IP packet header his electronic certificate (ISP X.509 Certificate), which contains the ISP's public key for decoding the checksum. Thereby, each recipient of the IP message can verify the correctness of the digital signature by decoding the checksum and comparing it to the checksum the recipient has calculated. In addition to that, the recipient has the option to obtain further data on the Internet user (name, address) from the certificate holder (the Internet Service Provider) named in the certificate. (This could be used for Malicious Caller Identification.)

The proposed realization shows similarities with IPSEC. The main difference, however, is that as opposed to IPSEC, no point-to-point authentication, but rather a point-to-multi-point authentication can be realized, since all data relevant for the authentication (the "name" of the Internet user, the name of the Internet Service Provider (ISP) and his certificate) is contained in the UP packet. In addition to that, there is neither an end-to-end, nor a host-to-host authentication, but rather an ISP-to-host authentication.

The realization of Internet user identification on the IP level requires a new, optional function of the IP stack. If this function is not available in a recipient host, the entire new AOD information (see FIG. 2) of an IP message is to be ignored. Standard IP stacks nowadays already support this function for unknown IP options.

Since the length of an IP message changes with the addition of AOD information, the total-length field as well as the header checksum in the IP header need to be recalculated. The digital signature of the Internet Service Provider is valid as long as the data in the IP payload doesn't change.

It is possible for data in the IP payload to be modified on the way of the IP message to the actual communication partner; this could happen through authorized proxies (such as the VIA field in SIP, IP addresses in NAT). The proxy then also recalculates the total-length field as well as the header checksum in the IP header.

In such a case, the proxy can already be the end host of the secured transfer according to the invention. This is the case for example, when the proxy executes the authentication of the Internet user in order to check whether the latter already is a client of the message recipient. The proxy checks the AOD and sends the IP message on without the AOD.

Or the proxy adjusts the AOD information and signs these changes by means of a digital signature. For this, the proxy calculates the Integrity Check Value and replaces the prior one with it. In addition, he replaces the ISP certificate with his certificate and adds ISP identification information to the origin identification data.

As opposed to a realization on the transport- or application level, the realization on the IP level has the advantage that the Internet Service Provider can quickly see in the POP, whether identification data needs to be added or not, since to this end, it is simply necessary to analyze the IP header or to check the policy data base performance advantage). The data on higher protocol levels, which is exchanged on an end-to-end basis, is not changed. The applications on Internet hosts which use this new IP option, require an expanded IP network interface (IP socket interface) in order to place an authentication flag for an outgoing IP packet when necessary, or to transfer sender identification data to the IP network interface and to read incoming received sender identification data. The ISP who offers the new Internet access feature "identification of Internet users" needs a policy database, which requires administration. In addition to this, the ISP needs a certificate from a public certification entity, which also requires administration and maintenance (update of certificate revocation lists, etc.).

The invention claimed is:

1. Method for identifying Internet users, comprising:
    identifying or authenticating an Internet user at an Internet access point in the course of an access check when using an Internet access service of an Internet Service Provider with whom the Internet user maintains a business relation; and
    after the Internet user successfully passed the access check, adding Internet user identification information to an Internet user's IP message by the Internet access point prior to forwarding said IP message, guaranteeing the integrity of the information with cryptographic means.

2. Method according to claim 1,
    wherein Internet user identification information is added only when a certain requirement is met.

3. Method according to claim 2,
    wherein an Internet user provides a requirement.

4. Method according to claim 1,
    wherein a requirement in question is checked at the access point, where to this end, information is taken from the IP message and/or a database.

5. Method according to claim 1,
    wherein the method is realized on the Internet protocol level.

6. Method according to claim 1,
    wherein the method is realized on the transport protocol level.

7. Method according to claim 1,
    wherein the method is realized on the user protocol level.

8. Method according to claim 1,
    wherein integrity of the Internet user identification information is guaranteed with a digital signature.

9. Internet access point which has structure for:
    identifying or authenticating an Internet user in the course of an Internet access service; and
    after the Internet access service has successfully been accomplished, adding Internet user identification information to an Internet user's IP message by an Internet access point prior to forwarding said IP message, guaranteeing the integrity of the information with cryptographic means.

10. Internet access point according to claim 9, further comprising structure for adding the Internet user identification information to the IP message only if a certain requirement is met.

11. Internet access point according to claim 10,
    further comprising structure for checking a requirement using information obtained from at least one of the IP message and a database.

* * * * *